(12) United States Patent
Shirahige

(10) Patent No.: US 12,292,837 B2
(45) Date of Patent: May 6, 2025

(54) INFORMATION PROCESSING APPARATUS AND CONTROL METHOD

(71) Applicant: FUJITSU LIMITED, Kawasaki (JP)

(72) Inventor: Yuji Shirahige, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/931,746

(22) Filed: Sep. 13, 2022

(65) Prior Publication Data
US 2023/0185726 A1 Jun. 15, 2023

(30) Foreign Application Priority Data
Dec. 13, 2021 (JP) .................. 2021-201757

(51) Int. Cl.
*G06F 12/1009* (2016.01)
*G06F 12/0815* (2016.01)
*G06F 12/0891* (2016.01)

(52) U.S. Cl.
CPC ...... *G06F 12/1009* (2013.01); *G06F 12/0815* (2013.01); *G06F 12/0891* (2013.01)

(58) Field of Classification Search
CPC ............. G06F 12/1009; G06F 12/0815; G06F 12/0891
See application file for complete search history.

(56) References Cited

U.S. PATENT DOCUMENTS

| 5,329,629 | A  | * | 7/1994  | Horst ................... | G06F 12/1027 |
| | | | | | 365/49.1 |
| 9,213,649 | B2 | * | 12/2015 | Koka ................... | G06F 12/1072 |
| 11,176,055 | B1 | * | 11/2021 | Mukherjee ............ | G06F 9/3836 |
| 2006/0259734 | A1 | * | 11/2006 | Sheu ................... | G06F 12/1036 |
| | | | | | 711/E12.065 |

(Continued)

FOREIGN PATENT DOCUMENTS

| JP | 6-139149 A | 5/1994 |
| JP | 2019-212167 A | 12/2019 |
| JP | 2020-529656 A | 10/2020 |

OTHER PUBLICATIONS

Barr, Thomas W., Alan L. Cox, and Scott Rixner. "Translation caching: skip, don't walk (the page table)." ACM SIGARCH Computer Architecture News 38.3 (2010): 48-59. (Year: 2010).*

(Continued)

*Primary Examiner* — Nicholas J Simonetti
(74) *Attorney, Agent, or Firm* — ArentFox Schiff LLP

(57) ABSTRACT

An information processing apparatus includes a conversion buffer configured to store a conversion pair of a virtual address of a page and a physical address, a page table cache configured to store data in a page table at a level other than a last level and a physical address of the data in association with each other, a memory, and a processor coupled to the memory, and configured to store a hash of the virtual address and process management information of a conversion source in each entry of the page table cache, and when executing a maintenance instruction of deleting the conversion pair in (Continued)

the conversion buffer by specifying at least one of the hash of the virtual address or the process management information, delete an entry of matching at least one of the hash of the virtual address and the process management information, in the page table cache.

6 Claims, 14 Drawing Sheets

(56) References Cited

U.S. PATENT DOCUMENTS

| | | | | |
|---|---|---|---|---|
| 2007/0250666 | A1* | 10/2007 | Sartorius | G06F 12/0891 |
| | | | | 711/3 |
| 2009/0292899 | A1* | 11/2009 | Mansell | G06F 12/1009 |
| | | | | 711/207 |
| 2014/0122829 | A1* | 5/2014 | Barrow-Williams | |
| | | | | G06F 12/1009 |
| | | | | 711/207 |
| 2018/0336133 | A1* | 11/2018 | Turner | G06F 12/1072 |
| 2019/0377686 | A1 | 12/2019 | Shirahige | |
| 2020/0218665 | A1 | 7/2020 | Swaine | |

OTHER PUBLICATIONS

Syeda, Hira Taqdees, and Gerwin Klein. "Formal reasoning under cached address translation." Journal of Automated Reasoning 64.5 (2020): 911-945. (Year: 2020).*

Gerber, Simon. Authorization, Protection, and Allocation of Memory in a Large System. Diss. ETH Zurich, 2018. (Year: 2018).*

* cited by examiner

FIG. 5

| TYPE OF TLBI | TLBI-opcode | PAGE TABLE CACHE DELETE SIGNAL |
|---|---|---|
| VA INSTRUCTION TYPE | 10 | 1 |
| ASID INSTRUCTION TYPE | 01 | 1 |
| VA AND ASID INSTRUCTION TYPE | 11 | 1 |
| IPA INSTRUCTION TYPE | 10 | 1 |
| OTHER THAN THE ABOVE | 00 | 1 |

FIG. 6

| TTL | MEANING OF TTL |
|---|---|
| 0100 | FLAG CORRESPONDING TO Lv0 PAGE TABLE |
| 0101 | FLAG CORRESPONDING TO Lv1 PAGE TABLE |
| 0110 | FLAG CORRESPONDING TO Lv2 PAGE TABLE |
| 0111 | FLAG CORRESPONDING TO Lv3 PAGE TABLE |

FIG. 8

| TTL | CALCULATION EXPRESSION OF HASH (va-hash [8:0]) |
|---|---|
| 0100 | VA[47:39] |
| 0101 | VA[47:39] ⊕ VA[38:30] |
| 0110 | VA[47:39] ⊕ VA[38:30] ⊕ VA[29:21] |
| 0111 | – |

FIG. 12

| TTL | VA-hash-match (BEFORE SELECTION) | | | VA-hash-match |
| --- | --- | --- | --- | --- |
| | FOR TTL = 0100 | FOR TTL = 0101 | FOR TTL = 0110 | |
| 0100 | 0 | * | * | 0 |
| 0100 | 1 | * | * | 1 |
| 0101 | * | 0 | * | 0 |
| 0101 | * | 1 | * | 1 |
| 0110 | * | * | 0 | 0 |
| 0110 | * | * | 1 | 1 |

FIG. 13

| TLBI-opcode | ASID-valid | VA-hash-match | ASID-match | Entry N delete |
|---|---|---|---|---|
| 00 | * | * | * | 1 |
| 01 | 0 | * | * | 0 |
| 01 | 1 | * | 0 | 0 |
| 01 | 1 | * | 1 | 1 |
| 10 | * | 0 | * | 0 |
| 10 | * | 1 | * | 1 |
| 11 | * | 0 | * | 0 |
| 11 | 0 | * | * | 0 |
| 11 | * | * | 0 | 0 |
| 11 | 1 | 1 | 1 | 1 |

INFORMATION PROCESSING APPARATUS AND CONTROL METHOD

CROSS-REFERENCE TO RELATED APPLICATION

This application is based upon and claims the benefit of priority of the prior Japanese Patent Application No. 2021-201757, filed on Dec. 13, 2021, the entire contents of which are incorporated herein by reference.

FIELD

The embodiment discussed herein is related to an information processing apparatus and a control method.

BACKGROUND

In many cases, a central processing unit (CPU) in recent years supports a virtual address (VA), and for this purpose, assistance by hardware is performed. For example, a translation lookaside buffer (TLB) that caches a conversion pair of a VA to a physical address (PA) is known, and hardware in which a TLB is installed is widely used.

Entries to be registered in a TLB are obtained by performing page table walk. Page table walk may be performed by hardware or software. In either case of performing page table walk by hardware and performing page table walk by software, there may be various patterns and the number of page tables to be referred to in the page table walk may be one or more than one, depending on the method.

In such page table walk, page table walk involving multiple times of page table references increases the number of times a page table is referred to from a memory, and thus it takes considerable time to execute the page table walk.

For example, a method of increasing the number of entries is used so as to hit the TLB as much as possible, but this alone is insufficient, and there is a demand that the page table walk itself may be speeded up as much as possible.

For this reason, in order to speed up the page table walk itself as much as possible, a technique is known in which a cache dedicated to a page table is provided in a configuration.

Since a page table cache is a cache of a page table like a TLB, when instructed by a TLB invalidate (TLBI) instruction from an operating system (OS) to delete an entry of a TLB, an entry of a page table cache also has to be deleted.

Hereinafter, deleting an entry in a TLB may be simply referred to as deleting a TLB. Similarly, hereinafter, deleting an entry in a page table cache may be simply referred to as deleting a page table cache.

An OS deletes a TLB when a certain page is removed from a memory and the page has to be deleted. Since storing in a page table is performed when a page is deleted, and a mismatch occurs between the page table and a cache of the page table (TLB or page table cache), the cache of the page table has to be deleted.

Japanese Laid-open Patent Publication No. 2019-212167, Japanese Laid-open Patent Publication No. 6-139149, and Japanese National Publication of International Patent Application No. 2020-529656 are disclosed as related art.

SUMMARY

According to an aspect of the embodiments, an information processing apparatus includes a conversion buffer configured to store a conversion pair of a virtual address of a page and a physical address, a page table cache configured to store data in a page table at a level other than a last level and a physical address of the data in association with each other, a memory, and a processor coupled to the memory, and configured to store a hash of the virtual address and process management information of a conversion source in each entry of the page table cache, and when executing a maintenance instruction of deleting the conversion pair in the conversion buffer by specifying at least one of the hash of the virtual address or the process management information, delete an entry of matching at least one of the hash of the virtual address and the process management information, in the page table cache.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram for describing a method of generating a page table cache delete signal by the TLB maintenance instruction control circuit in the information processing apparatus as an example of the embodiment;

FIG. 6 is a diagram for describing TTL in the information processing apparatus as an example of the embodiment;

FIG. 8 is a diagram illustrating a method of generating a VA hash by a hashing circuit of the information processing apparatus as an example of the embodiment;

FIG. 12 is a diagram for describing a method of setting VA-hash-match by a delete signal generation circuit in the information processing apparatus as an example of the embodiment;

FIG. 13 is a diagram for describing processing of the delete signal generation circuit in the information processing apparatus as an example of the embodiment.

DESCRIPTION OF EMBODIMENTS

Figure 1:
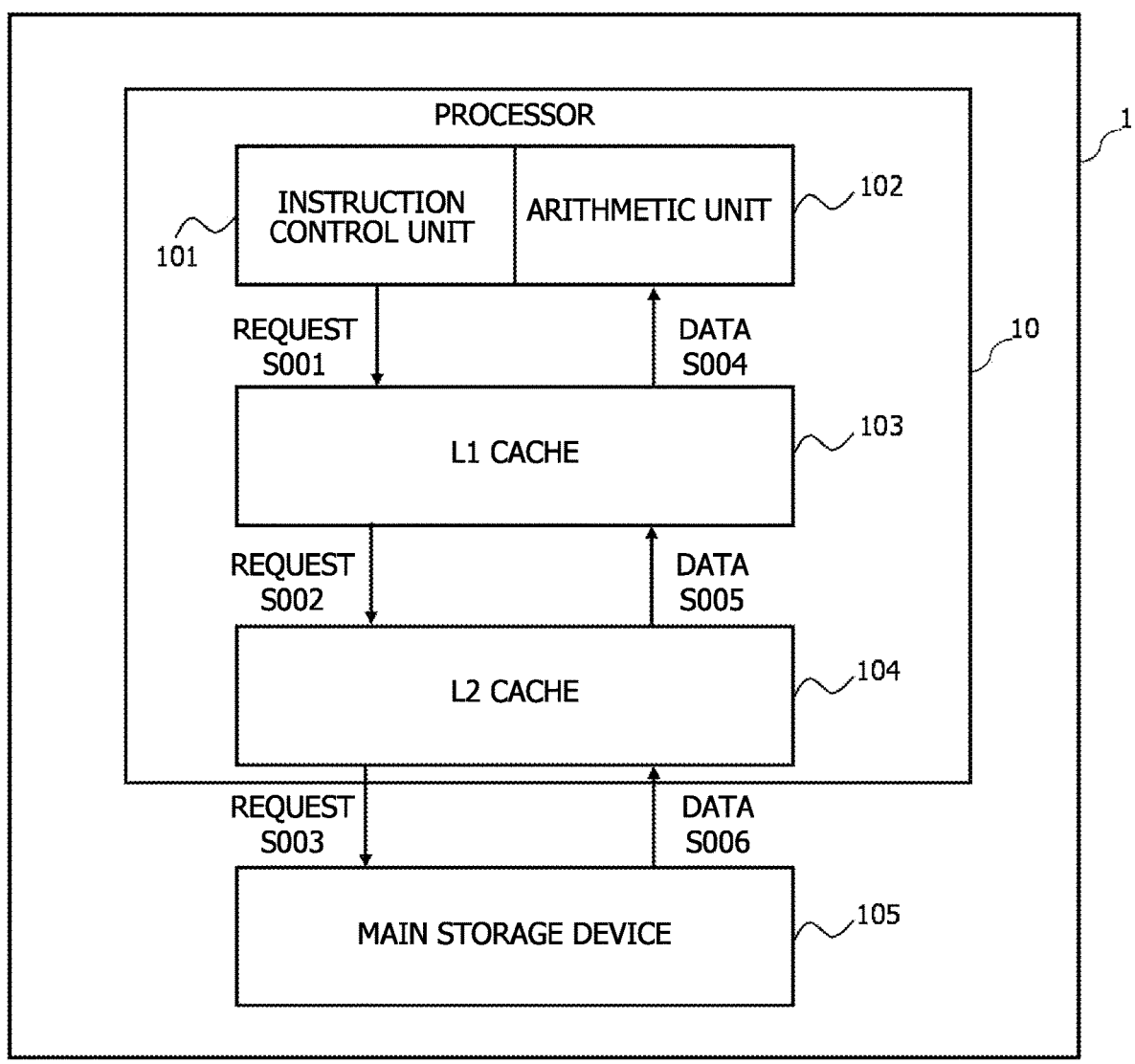
FIG. 1 is a diagram schematically illustrating the configuration of an information processing apparatus as an example of an embodiment.

In the page table management method of the related art, when a TLBI instruction is executed, the cache of a page table is entirely deleted. For this reason, in a page table cache, even an entry of a cache of a page table that does not have to be deleted is deleted, and the cache efficiency decreases.

Hereinafter, an embodiment of a technique for efficiently managing a page table cache will be described with reference to the drawings. However, the following embodiment is merely exemplary, and it is not intended to exclude application of various modification examples and techniques that are not explicitly described in the embodiment. For example, the present embodiment may be variously modified and implemented without departing from the spirit of the embodiment. The drawings are not provided with an intention that only the elements illustrated in the drawings are included. Other functions and the like may be included.

(A) Configuration

FIG. 1 is a diagram schematically illustrating the configuration of an information processing apparatus 1 as an example of the embodiment. The information processing apparatus 1 exemplified in FIG. 1 includes a processor 10 and a main storage device 105.

For example, the main storage device 105 is a semiconductor memory such as a random-access memory (RAM), and stores information to be used by the processor 10. Information stored in the main storage device 105 may be an instruction included in a program executed by the processor 10 or may be data processed by the processor 10 based on the instruction.

For example, the processor 10 is a CPU, and includes an instruction control unit 101, an arithmetic unit 102, an L1 cache 103, and an L2 cache 104 in the example illustrated in FIG. 1.

The L1 cache 103 and the L2 cache 104 are cache memory circuits in the processor 10, and the L2 cache 104 is a cache memory circuit at a level lower than that of the L1 cache 103. The L1 cache 103 and the L2 cache 104 temporarily store information read from the main storage device 105.

For example, the L2 cache 104 may be provided outside the processor 10, or another cache may be provided in the processor 10. Changes may be made appropriately for implementation.

When requesting access target data stored in the main storage device 105, the instruction control unit 101 outputs a data request (S001) to the L1 cache 103. When the L1 cache 103 stores the access target data, the L1 cache 103 outputs the access target data (S004) to the arithmetic unit 102.

By contrast, when the L1 cache 103 does not store the access target data, the L1 cache 103 outputs a data request (S002) to the L2 cache 104. When the L2 cache 104 stores the access target data, the L2 cache 104 outputs the access target data (S005) to the L1 cache 103. The L1 cache 103 outputs the data (S005) received from the L2 cache 104 to the arithmetic unit 102 as the data (S004).

By contrast, when the L2 cache 104 does not store the access target data, the L2 cache 104 outputs a data request (S003) to the main storage device 105. The main storage device 105 outputs access target data (S006) to the L2 cache 104. The L2 cache 104 outputs the data (S006) received from the main storage device 105 to the L1 cache 103 as the data (S005). The L1 cache 103 outputs the received data (S005) to the arithmetic unit 102 as the data (S004). The arithmetic unit 102 performs arithmetic operation using the data (S004).

In a case where software (OS) rewrites a page table, a TLB maintenance instruction is issued by the software (OS) in order to resolve a mismatch between an address conversion pair (a combination of a conversion source VA and a conversion destination PA) in a TLB 204 to be described later and the page table in the main storage device 105.

Figure 2:
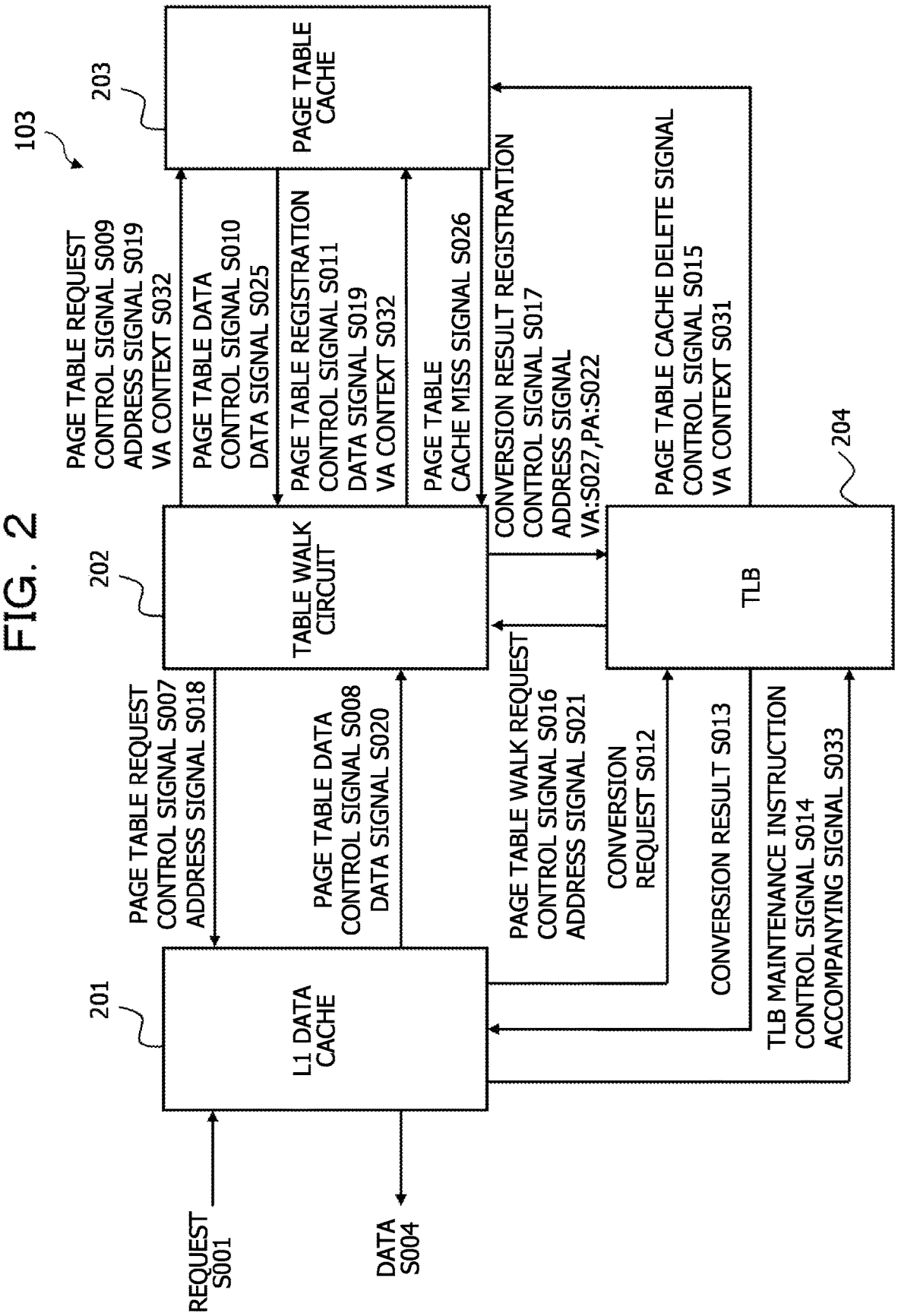
FIG. 2 is a diagram schematically illustrating the configuration of an L1 cache of the information processing apparatus as an example of the embodiment.

A TLB maintenance instruction is a maintenance instruction for instructing deletion of a conversion pair in the TLB 204 (conversion buffer, see FIG. 2). A TLB maintenance instruction is issued by designating no VA and address space identifier (ASID), designating either one of VA and ASID, or designating both of VA and ASID. An ASID is identification information for identifying a process on an OS, and corresponds to process management information.

In this case, the instruction control unit 101 notifies the L1 cache 103 of a TLB maintenance request. Accompanying information is included in the TLB maintenance request. For example, the instruction type of TLB maintenance instruction, an ASID, and a VA of an access target instruction are included in the accompanying information. The VA of an access target instruction corresponds to a request address. The instruction control unit 101 functions as a request generation unit that generates an information request including a request address.

The arithmetic unit 102 performs arithmetic operation in accordance with an instruction from the instruction control unit 101. The arithmetic unit 102 performs arithmetic operation using the data (S004) acquired from the L1 cache 103.

FIG. 2 is a diagram schematically illustrating the configuration of the L1 cache 103 of the information processing apparatus 1 as an example of the embodiment.

As illustrated in FIG. 2, the L1 cache 103 includes an L1 data cache 201, a table walk circuit 202, a page table cache 203, and the TLB 204.

The L1 data cache 201 stores data and the like. When receiving the data request (reference sign S001) from the instruction control unit 101, the L1 data cache 201 provides the arithmetic unit 102 with the data (S004) corresponding to the data request.

The TLB 204 is a conversion buffer that stores the VA of a page and the PA of the page in association with each other. The page table cache 203 stores data in a page table at a level other than the last level among page tables at a plurality of levels included in a multistage page table and the PA of the data in association with each other. This is because the number of tables at the last level tends to be larger than the number of tables at other levels, and the number of entries in the page table cache 203 increases when data at the last level is stored.

In the information processing apparatus 1, in a case where the access target page table is a table at the last level, registration of data in the access target page table in the page table cache 203 is suppressed. Accordingly, the number of entries in the page table cache 203 is significantly reduced, and the hardware scale of a page table buffer 503 is reduced. Data in a page table may be referred to as a page table entry.

In a case where the TLB 204 stores the VA of a page corresponding to a request address, it may be said that the request address hits the TLB 204. In a case where the TLB 204 does not store the VA of the page, it may be said that a TLB miss occurs. The TLB 204 corresponds to a conversion buffer that stores the VA of a page and the PA of the page in association with each other.

When receiving a VA conversion request transmitted from the L1 data cache 201, the TLB 204 searches whether the VA related to the conversion request is registered as an entry in the TLB 204. When an entry is hit as a result of the search, the TLB 204 provides the L1 data cache 201 with a conversion result (S013). The L1 data cache 201 outputs the data (S004) corresponding to the conversion result (S013) to the arithmetic unit 102.

When the VA related to the conversion request is not registered as an entry in the TLB 204, for example, when a TLB miss occurs, the TLB 204 issues a page table walk request to the table walk circuit 202. A page table walk request is a request for causing the table walk circuit 202 to execute page table walk and to perform address conversion. A page table walk request includes a control signal (S016) and an address signal (S021).

Figure 3:
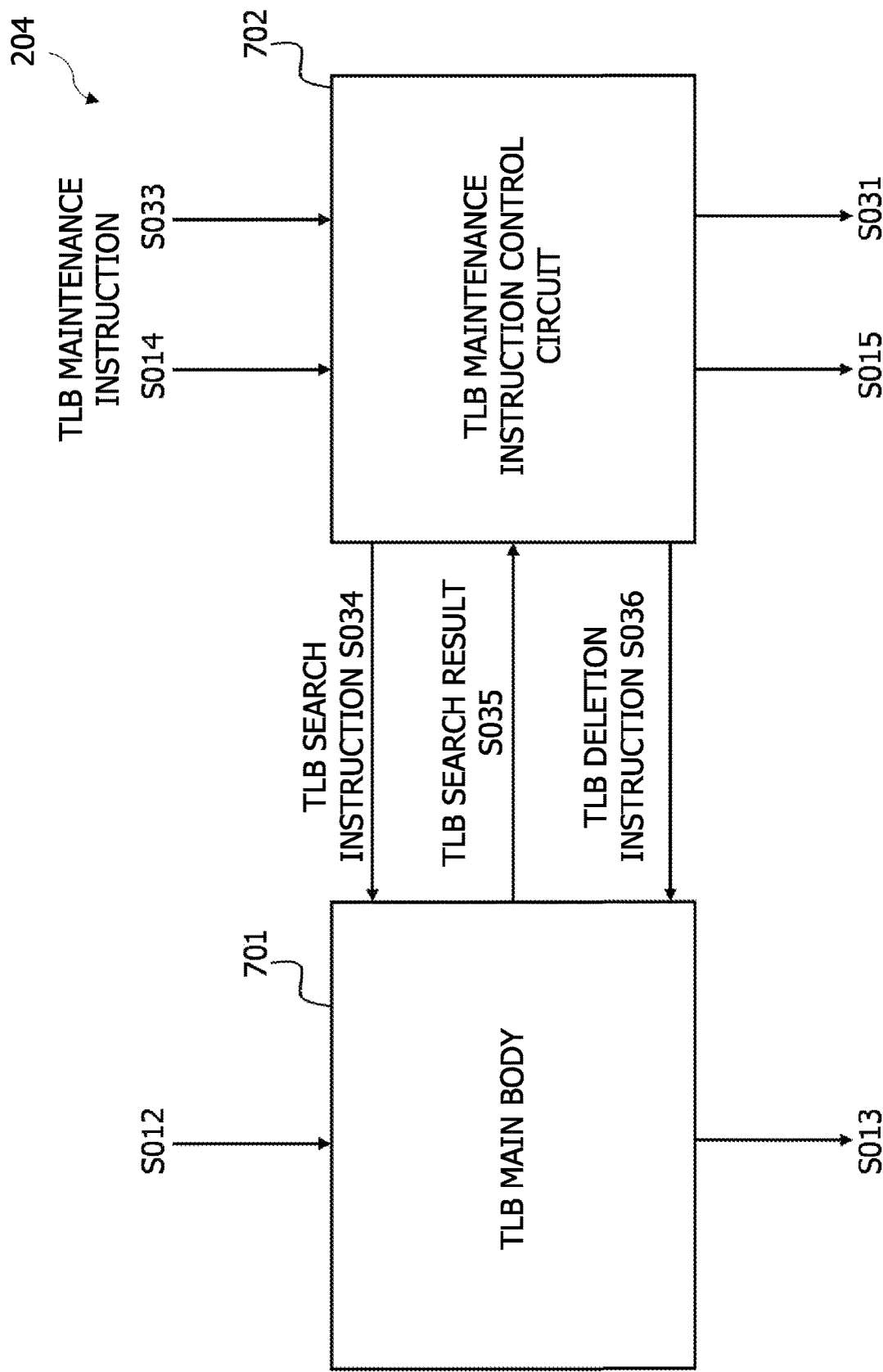
FIG. 3 is a diagram schematically illustrating the configuration of a TLB of the information processing apparatus as an example of the embodiment.

FIG. 3 is a diagram schematically illustrating the configuration of the TLB 204 of the information processing apparatus 1 as an example of the embodiment. As illustrated in FIG. 3, the TLB 204 includes a TLB main body 701 and a TLB maintenance instruction control circuit 702. The TLB main body 701 includes a storage area that stores a conversion pair of a VA to a PA.

When being notified of a TLB maintenance instruction (S014/S033) from the instruction control unit 101, the TLB maintenance instruction control circuit 702 executes maintenance on the TLB main body 701 and deletes an entry of the deletion target in the TLB main body 701.

When receiving the TLB maintenance instruction (S014/S033), the TLB maintenance instruction control circuit 702 issues an instruction for deleting an entry to the page table cache 203 and the TLB main body 701.

First, the TLB maintenance instruction control circuit 702 transmits, to the TLB main body 701, a TLB search instruction (S034) based on accompanying information (S033) of the TLB maintenance instruction. The TLB main body 701 performs a search in accordance with the TLB search instruction (S034), and provides the TLB maintenance instruction control circuit 702 with a TLB search result (S035) when there is a hit as a result of the search.

The TLB maintenance instruction control circuit 702 transmits a TLB deletion instruction (S036) to the TLB main body 701 based on the received TLB search result (S035). The TLB main body 701 deletes the corresponding entry in accordance with the TLB deletion instruction (S036).

Figure 4:
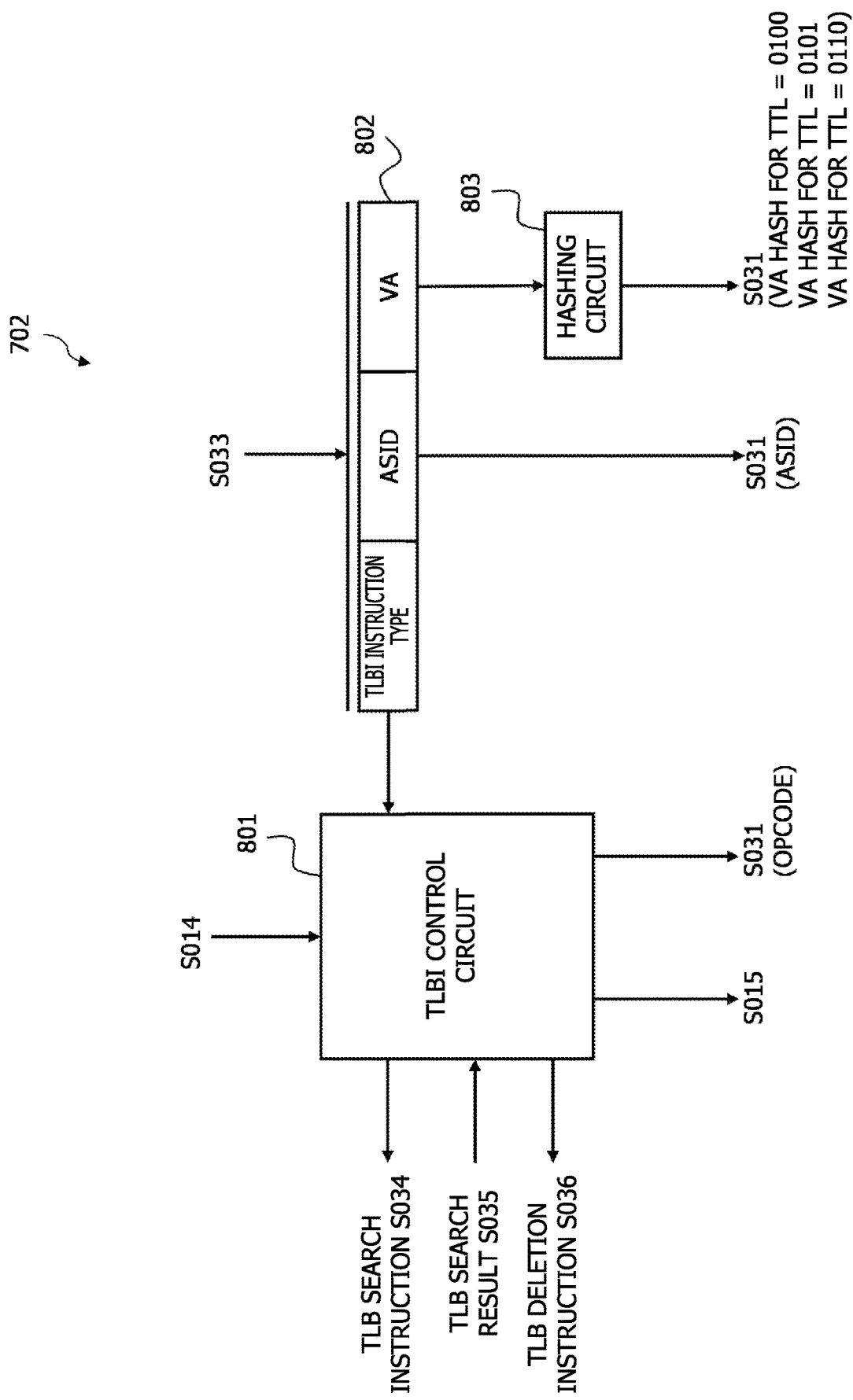
FIG. 4 is a diagram exemplifying the configuration of a TLB maintenance instruction control circuit in the information processing apparatus as an example of the embodiment.

FIG. 4 is a diagram exemplifying the configuration of the TLB maintenance instruction control circuit 702 in the information processing apparatus 1 as an example of the embodiment. As illustrated in FIG. 4, the TLB maintenance instruction control circuit 702 includes a TLBI control circuit 801, a register 802, and a hashing circuit 803. The register 802 stores the accompanying information (S033) of a TLB maintenance instruction.

The TLB maintenance instruction control circuit 702 generates a page table cache delete signal (S015), TLBI-opcode (OPCODE), VA-Hash, and an ASID (S031) based on the accompanying information (S033) stored in the register 802. VA-Hash is a hash value generated based on a VA. Hereinafter, VA-Hash may also be referred to as VA hash.

FIG. 5 is a diagram for describing a method of generating the page table cache delete signal (S015) by the TLB maintenance instruction control circuit 702 in the information processing apparatus 1 as an example of the embodiment.

FIG. 5 illustrates a rule for generating a page table cache delete signal. As illustrated in FIG. 5, the TLB maintenance instruction control circuit 702 generates a page table cache delete signal according to the type of TLBI (instruction type). The TLB maintenance instruction control circuit 702 sets a TLBI-opcode according to the type of TLBI.

As the types of TLBI, FIG. 5 illustrates five types which are a VA instruction type, an ASID instruction type, a VA and ASID instruction type, an IPA instruction type, and an instruction type other than the above. For example, in the VA instruction type, in TLB maintenance, the page table of an entry in which there is a matching value for VA (VA hash) is deleted in the page table cache 203. In the ASID instruction type, in TLB maintenance, the page table of an entry in which there is a matching value for ASID is deleted in the page table cache 203. In the VA and ASID instruction type, in TLB maintenance, the page table of an entry in which there is a matching value for both of VA (VA hash) and ASID is deleted in the page table cache 203.

The hashing circuit 803 of the TLB maintenance instruction control circuit 702 reads a VA stored in the register 802 and generates a VA hash by performing hashing operation. Hashing operation may be achieved by using a known method, and description thereof will be omitted.

The hashing circuit 803 generates three VA hashes for different values of time to live (TTL). For example, the hashing circuit 803 generates a VA hash for TTL=0100, a VA hash for TTL=0101, and a VA hash for TTL=0110, based on a VA. The TLB maintenance instruction control circuit 702 outputs an ASID stored in the register 802 as it is (S031).

FIG. 6 is a diagram for describing TTL in the information processing apparatus 1 as an example of the embodiment. FIG. 6 exemplifies the meaning corresponding to each value of TTL. The example illustrated in FIG. 6 indicates that the values of TTL (0100 to 0111) are flags corresponding to the page tables at Lv0 to Lv3, respectively. TTL is generated by a control circuit 305 of the table walk circuit 202 to be described later (see FIG. 7) based on a state such as Stage1-Lv0-State.

When receiving a page table walk request (S016, S021) from the TLB 204, the table walk circuit 202 executes page table walk in response to the table walk request, and performs address conversion of a request address. The page table walk request (S016, S021) includes the control signal (S016) and the address signal (S021). Table walk is known and description thereof will be omitted.

The table walk circuit 202 causes the TLB 204 to register the converted PA in association with the VA. The table walk circuit 202 causes the TLB 204 to register an address conversion pair of the PA and the VA by giving an instruction of conversion result registration to the TLB 204. A control signal (S017), an address signal of the VA (S027), and an address signal of the PA (S022) are included in the conversion result registration.

In table walk processing, the table walk circuit 202 fetches a page table. First, the table walk circuit 202 outputs a page table request to the page table cache 203, and inquires whether a page table is stored in the page table cache 203. A control signal (S009), an address signal (S019), and a VA context (S032) are included in the page table request. The address signal (S019) includes a PA of data in the access target page table. For example, the VA context (S032) may include TTL and ASID-Valid.

When the target page table is in the page table cache 203 as a result of the inquiry by the page table request (S009/S019/S032), the table walk circuit 202 receives page table data from the page table cache 203 and continues the address conversion. The page table data provided from the page table cache 203 includes a control signal (S010) and a data signal (S025).

When the target page table is not in the page table cache 203 as a result of the inquiry by the page table request (S009/S019/S032), the page table cache 203 outputs a page table cache miss signal (S026) to the table walk circuit 202. In a case where the target page table is not in the page table cache 203, the table walk circuit 202 transmits a page table request to the L1 data cache 201 and requests the page table. A control signal (S007) and an address signal (S018) are included in the page table request.

The table walk circuit 202 makes an inquiry to the L2 cache 104 or the main storage device 105 through the L1 data cache 201, and receives page table data from the L1 data cache 201. A control signal (S008) and a data signal (S020) are included in the page table data.

When a page table is acquired via the L1 data cache 201, the table walk circuit 202 registers the data of the page table in the page table cache 203. The table walk circuit 202 registers the data of the page table in the page table cache 203 by giving an instruction of page table registration to the page table cache 203. A control signal (S011), a data signal (S019), and the VA context (S032) are included in the page table registration. However, in a case where the page table is a table at the last level, registration of the page table data in the page table cache 203 is suppressed.

When table walk is completed, the table walk circuit 202 causes the TLB 204 to register the conversion result by giving an instruction of conversion result registration to the TLB 204. The control signal (S017) and the address signal (S018) are included in the conversion result registration.

In a case where the TLB 204 does not store a virtual address corresponding to a request address, the table walk circuit 202 obtains the physical address of data in the access target page table from the request address. In a case where the access target page table is a page table at a level other than the last level, the table walk circuit 202 searches the page table cache 203 for data in the access target page table.

In a case where the access target page table is a page table at the last level, the table walk circuit 202 functions as a control unit that acquires data in the access target page table from the L1 data cache 201 and causes the TLB 204 to register the VA and PA of the page indicated by the acquired data.

Figure 7:
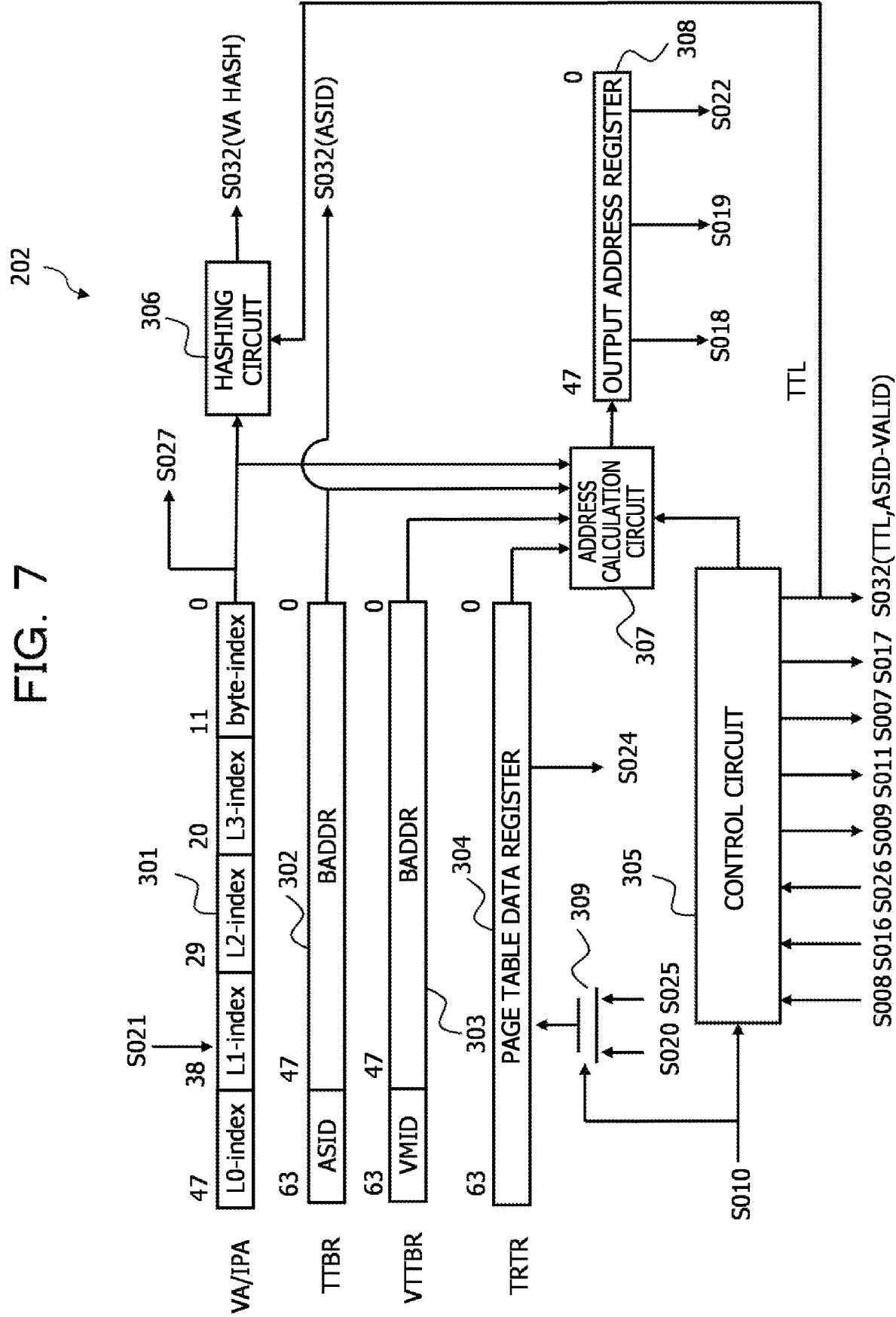
FIG. 7 is a diagram exemplifying the configuration of a table walk circuit of the information processing apparatus as an example of the embodiment.

FIG. 7 is a diagram exemplifying the configuration of the table walk circuit 202 of the information processing apparatus 1 as an example of the embodiment. The table walk circuit 202 includes a VA/IPA register 301, a TTBR 302, a VTTBR 303, a page table data register 304, the control circuit 305, a hashing circuit 306, an address calculation circuit 307, an output address register 308, and a selector 309. IPA is an abbreviation for intermediate physical address. TTBR is an abbreviation for translation table base register, and VTTBR is an abbreviation for virtualization translation table base register.

The VA/IPA register 301 is a register that stores the address signal (S021) of a page table walk request. The TTBR 302 is a register that holds a physical base address of a page table at a specific operation level. The VTTBR 303 is a register that holds a physical base address of a page table for stage 2 conversion of memory access from a non-secure mode other than the Hyp mode.

The hashing circuit 306 generates a VA hash by using an address read from the VA/IPA register 301. For example, the generated VA hash is included in the VA context (S032) of the page table registration, transmitted to the page table cache 203, and managed in association with the data of the page table.

FIG. 8 is a diagram illustrating a method of generating a VA hash by the hashing circuit 306 of the information processing apparatus 1 as an example of the embodiment. FIG. 8 illustrates calculation expressions of hash in association with the values of TTL (0100, 0101, 0110, 0111). A circled "+" in the drawing represents an exclusive OR (EXOR). As illustrated in FIG. 8, the hashing circuit 306 calculates a VA hash according to the value of TTL.

The address calculation circuit 307 calculates an address of a table in accordance with an instruction of the control circuit 305. The address calculation circuit 307 calculates an address by using Lv0-index, which is a part of a VA, and a base address (BADDR) of the TTBR 302, and inputs the address to the output address register 308.

For example, the address calculation circuit 307 adds Lv1-index stored in the VA/IPA register 301 to a level 1 table address, and obtains the PA of data in the level 1 page table.

The address calculation circuit 307 adds Lv2-index stored in the VA/IPA register 301 to a level 2 table address, and obtains the PA of data in the level 2 page table.

The address calculation circuit 307 adds Lv3-index stored in the VA/IPA register 301 to a level 3 table address, and obtains the PA of data in the level 3 page table.

The address calculation circuit 307 stores the obtained PA in the output address register 308, and the output address register 308 outputs the address signal (S019) indicating the stored PA to the page table cache 203.

A table fetch address calculated by the address calculation circuit 307 is input to the output address register 308. Searching of the page table cache 203 is performed with the address read from the output address register 308.

When there is a cache hit as a result of searching the page table cache 203 with the address read from the output address register 308, page table data is input to the selector 309. The control signal (S010) and the data signal (S025) are included in the page table data.

The selector 309 is controlled by a page table data transfer signal (S010=1), and inputs the address of page table data transmitted from the page table cache 203 to the page table data register 304. The address of a page table to be accessed by table walk is stored in the page table data register 304. The control circuit 305 controls table walk processing of the table walk circuit 202.

For example, in the table walk circuit 202, when a page table walk request (S016/S021) is input from the TLB 204, the request address thereof (S021) is stored in the VA/IPA register 301. At this time, the control circuit 305 enters a state in which a page table at level 0 (Lv0) is fetched (Stage1-Lv0-State). In this state, the control circuit 305 instructs the address calculation circuit 307 to calculate the PA of data in the level 0 page table.

When there is no cache hit as a result of searching the page table cache 203 with the address read from the output address register 308, for example, when there is a miss in the page table cache 203, the page table cache miss signal (S026) is transmitted from the page table cache 203 to the control circuit 305. The control circuit 305 transmits a page table request to the L1 data cache 201. The control signal (S007) and the address signal (S018) are included in the page table request.

After the page table data (S008/S020) is provided from the L1 data cache 201, the control circuit 305 controls the selector 309 and causes the selector to store the page table data in the page table data register 304. The control circuit 305 gives an instruction of page table registration (S011/S019/S032) to the page table cache 203 only when a page table is acquired from the L1 data cache 201.

When a page table is acquired from the page table cache 203 or the L1 data cache 201, the control circuit 305 is notified by the page table data transfer signal (S008/S010) that the page table has been successfully acquired. Then, the control circuit 305 transitions to the next state (Stage1-Lv1-State), and starts the operation of calculating the next page table address.

The control circuit 305 performs address calculation up to Lv3 in the similar manner. Since Lv3 is the last level, when a page table is acquired from the L1 data cache 201, registration operation to the page table cache 203 is not performed. Since a PA desired to be obtained is included in the page table acquired by Lv3 table fetch, the control circuit 305 extracts the PA via the output address register 308 and registers the PA in the TLB 204 (S017/S027/S022).

The control circuit 305 also generates TTL. The control circuit 305 generates TTL based on a state such as Stage1-Lv0-State. A method of generating TTL is known, and description thereof will be omitted.

The table walk circuit 202 acquires data in the access target page table from the L1 data cache 201 and outputs the data to the page table cache 203, when the access target page table is a page table at a level other than the last level and the page table buffer does not store the PA of the data in the access target page table or the hash of the VA (VA hash) of the conversion source and ASID do not match those of the entry of the page table cache 203 even if the page table buffer stores the PA.

The L1 data cache 201 receives the data request (S001) from the instruction control unit 101, and provides the arithmetic unit 102 with the data (S004) corresponding to the data request. Since the data request from the instruction control unit 101 is provided as a VA for accessing data, the VA has to be converted into a PA. Accordingly, the L1 data cache 201 issues a VA conversion request (S012) to the TLB 204. When receiving a PA as a conversion result of VA from the TLB 204, the L1 data cache 201 provides the arithmetic unit 102 with data of the PA.

When a TLB maintenance request (S001) with accompanying information is issued from the instruction control unit 101 to the L1 data cache 201, the L1 data cache 201 temporarily holds the TLB maintenance request.

After that, the L1 data cache 201 outputs a TLB maintenance instruction to the TLB 204. A control signal (S014) and an accompanying information (S033) are included in the TLB maintenance instruction. The accompanying information (S033) is set according to the type of TLB maintenance instruction. The instruction type of TLB maintenance instruction, an ASID, and a VA may be included in the accompanying information (S033).

The page table cache 203 stores data of a page table. A page table is a cache memory that stores data in a page table at a level other than the last level and the physical address (PA) of the data in the page table in association with each other.

Figure 9:
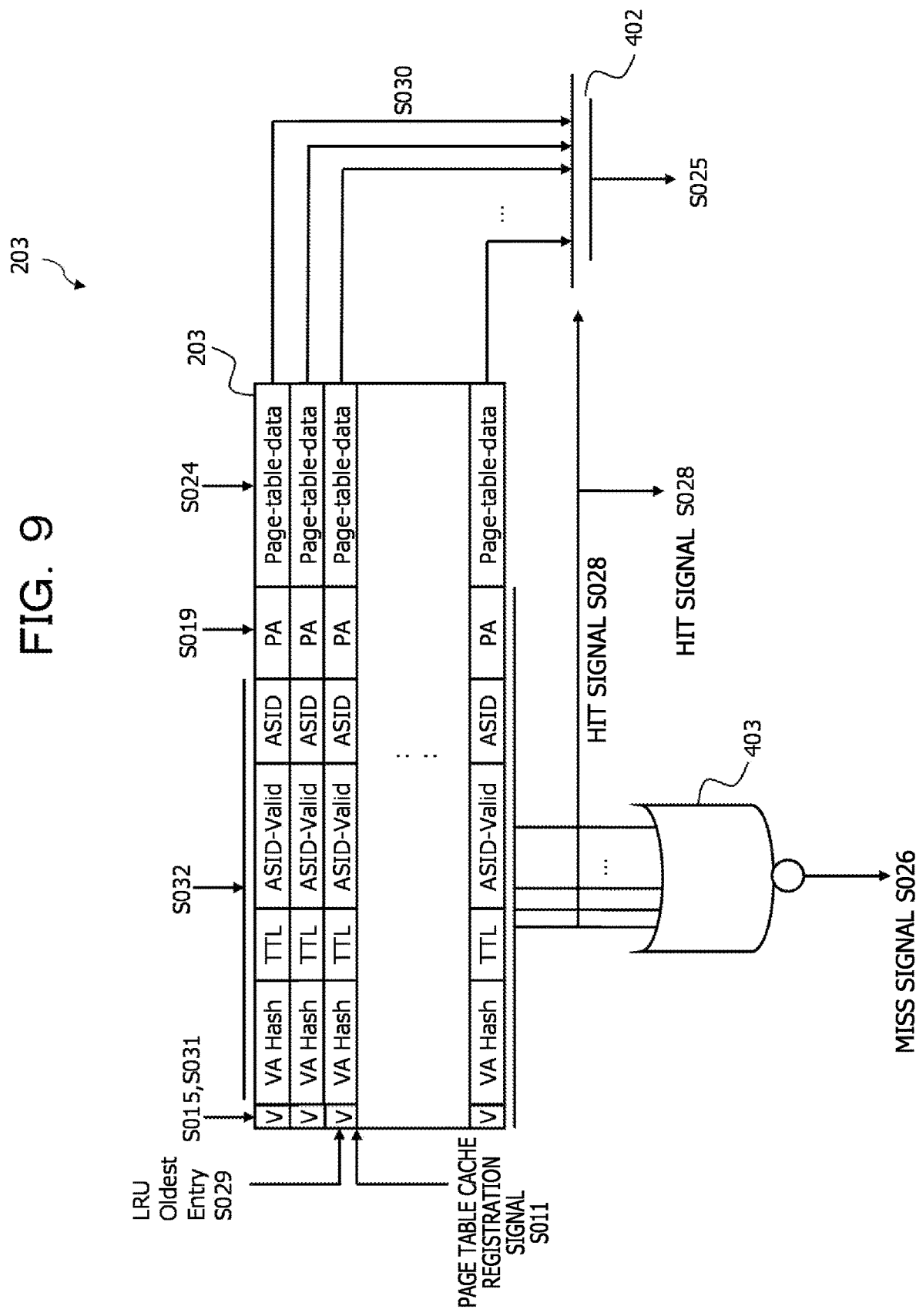
FIG. 9 is a diagram exemplifying the configuration of a page table cache in the information processing apparatus as an example of the embodiment.
Figure 10:
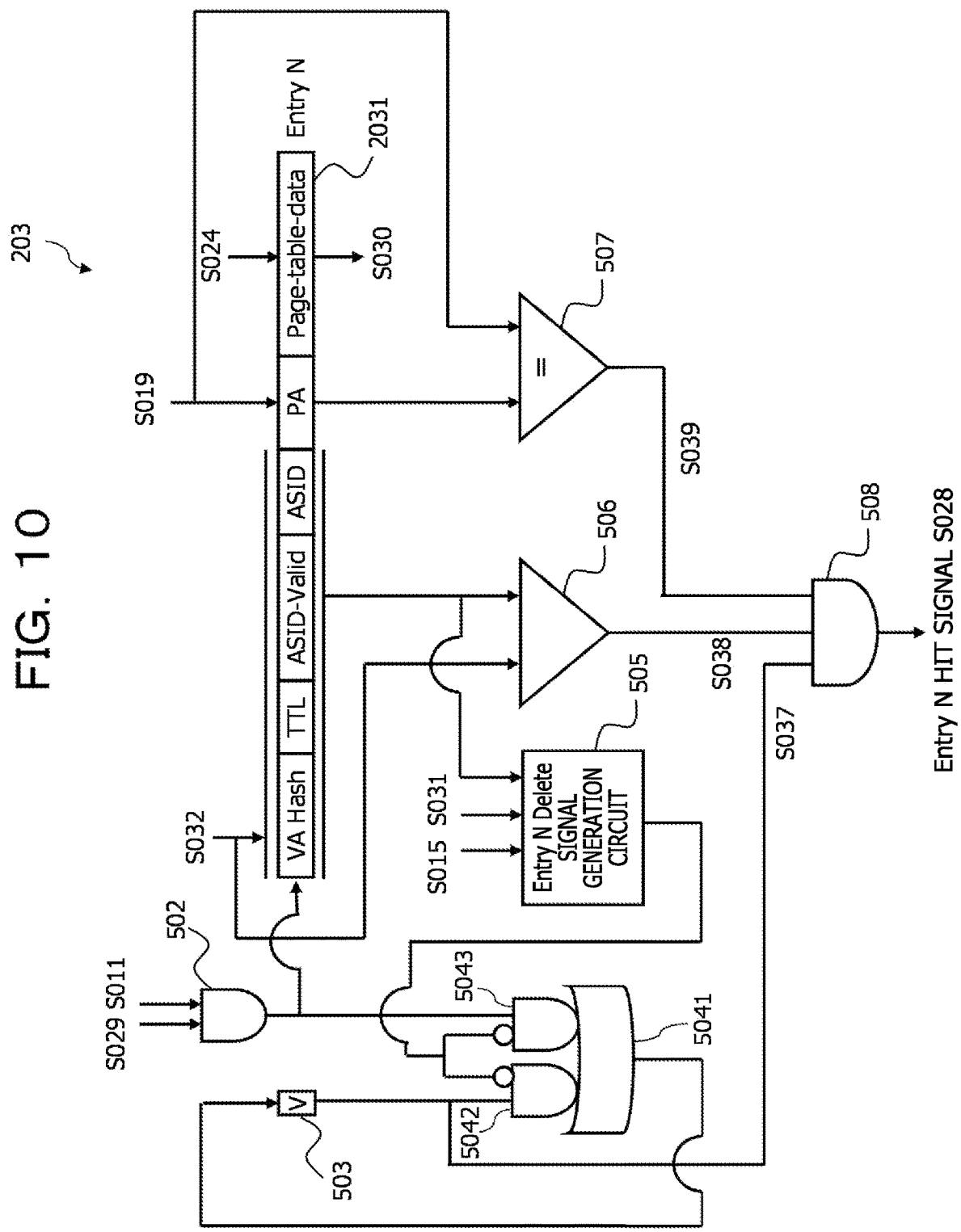
FIG. 10 is a diagram exemplifying the configuration of each entry of the page table cache in the information processing apparatus as an example of the embodiment.

FIG. 9 is a diagram exemplifying the configuration of the page table cache 203 in the information processing apparatus 1 as an example of the embodiment, and FIG. 10 is a diagram exemplifying the configuration of each entry of the page table cache 203.

As illustrated in FIG. 9, the page table cache 203 includes a plurality of entries. In the example illustrated in FIG. 9, each entry of the page table cache 203 includes valid bit V, VA hash, TTL, ASID-Valid, ASID, PA, and Page-table-data.

Valid bit V is a flag representing whether an entry in which the valid bit is set is valid. For example, when valid bit V is logic "1", the entry is valid, and when valid bit V is logic "0", the entry is invalid.

Page-table-data is data in a page table and corresponds to a data portion. VA Hash, TTL, ASID-Valid, ASID, and PA correspond to a tag (TAG) portion. PA represents a PA of data in a page table. Each of TTL, ASID-Valid, and ASID is known information, and detailed description will be omitted.

A hash of a VA of the conversion source (VA hash) and ASID (process management information) are stored in each entry of the page table cache 203. For example, the page table cache 203 is updated by a least recently used (LRU) method. For example, a control queue (not illustrated) stores the usage order of a plurality of entries in the page table cache 203, and among the plurality of entries, the oldest entry used in the past, for example, an entry in which the longest time has elapsed since the entry was used last is set as a deletion target.

When the table walk circuit 202 searches the page table cache 203, the page table cache 203 receives the address signal (S019) indicating the PA of data in a page table from the table walk circuit 202. Each entry in the page table cache 203 compares the PA indicated by the address signal (S019) with the PA included in the entry, and outputs a hit signal (S028) indicating a comparison result to a selector 402 and a negative OR (NOR) circuit 403.

When the PA indicated by the address signal (S019) matches the PA of the entry, the hit signal (S028) is logic "1". When the PA indicated by the address signal (S019) does not match the PA of the entry, the hit signal (S028) is logic "0".

Each entry outputs a data signal (S030) indicating page table data to the selector 402. The selector 402 selects the data signal (S030) of the entry indicated by the hit signal (S028) of logic "1" based on the hit signal (S028) output from each entry, and outputs the selected data signal as the data signal (S025).

The NOR circuit 403 outputs a negative OR of the hit signal (S028) output from each entry EN as the miss signal (S026). Accordingly, when the PA indicated by the address signal (S019) matches the PA of any entry, the miss signal (S026) is logic "0". When the PA indicated by the address signal (S019) does not match any PA of the entries, the miss signal (S026) is logic "1". When the miss signal (S026) is logic "1", the table walk circuit 202 outputs the control signal (S007) and the address signal (S018) of a page table request to the L1 data cache 201.

When the table walk circuit 202 registers data in a page table in the page table cache 203, the page table cache 203 receives a page table registration control signal (S011), the address signal (S019), a data signal (S024), and the VA context (S032) from the table walk circuit 202. The PA indicated by the address signal (S019) and the data in a page table indicated by the data signal (S024) are stored in the entry indicated by a signal (S029) of the oldest entry of LRU, and the data of the entry is updated.

At the time of searching the page table cache 203, the table walk circuit 202 notifies the page table cache 203 of VA-Hash/TTL/ASID-Valid/ASID/PA (S019/S032) of a table address. In the page table cache 203, the notified VA-Hash/TTL/ASID-Valid/ASID/PA (S019/S032) are compared with the flags of VA-Hash/TTL/ASID-Valid/ASID/PA stored in each entry of the page table cache 203.

A hit signal as a comparison result is input to the selector 402, and an entry in which there is a cache hit is selected. Page table data of the selected entry is read.

All of the hit signals (S028) are input to the NOR circuit 403, and when all of these hit signals are 0, the page table cache miss signal (S026) is output. The page table cache miss signal (S026) is input to the table walk circuit 202.

When the page table cache miss signal (S026) is input, the table walk circuit 202 transmits the page table request control signal (S007) to the L1 data cache 201.

Replacement of the page table cache 203 is controlled by LRU. For this reason, in the page table cache 203, rearrangement is performed such that the entry corresponding to the hit signal (S028) is the newest. At the time of registration in the page table cache 203, the signal (S029) representing the oldest entry is output, and registration is performed for the entry represented by the signal.

FIG. 10 illustrates the configuration of an arbitrary entry (Entry N) in the page table cache 203. Each entry of the page table cache 203 includes AND (logical product) circuits 502, 508, 5042, and 5043, buffers 503 and 2031, comparison circuits 506 and 507, an OR circuit 5041, and a delete signal (Entry N Delete signal) generation circuit 505.

The buffer 2031 stores VA-Hash, TTL, ASID-Valid, ASID, PA, and Page-table-data. The AND circuit 502 outputs, to the AND circuit 5043 and the buffer 2031, a logical product of the page table registration control signal (S011) and the signal (S029) of the oldest entry of LRU. In a case where the table walk circuit 202 registers data in a page table in the page table cache 203, the page table registration control signal (S011) is logic "1". In other cases, the page table registration control signal (S011) is logic "0".

The AND circuit 5042 outputs, to the OR circuit 5041, a logical product of the negation of a delete signal (Entry N Delete signal) output by a delete signal generation circuit 505 to be described later and the valid bit V stored in the buffer 503.

The AND circuit 5043 outputs, to the OR circuit 5041, a logical product of the negation of a delete signal from the delete signal generation circuit 505 and an output of the AND circuit 502. The OR circuit 5041 outputs, to the buffer 503, a logical sum of an output of the AND circuit 5042 and an output of the AND circuit 5043, and the buffer 503 holds the output of the OR circuit 5041 as valid bit V.

In a case where the table walk circuit 202 searches the page table cache 203, the comparison circuit 507 compares the PA indicated by the address signal (S019) with the PA stored in the buffer 2031, and outputs the comparison result to the AND circuit 508. When the PA indicated by the address signal (S019) matches the PA in the buffer 2031, the comparison result is logic "1". When the PA indicated by the address signal (S019) does not match the PA in the buffer 2031, the comparison result is logic "0".

The comparison circuit 506 compares the VA-Hash/TTL/ASID-Valid/ASID (S032) of a page table address transmitted from the table walk circuit 202 with VA-Hash/TTL/ASID-Valid/ASID of the TAG portion stored in the buffer 2031, and outputs the comparison result to the AND circuit 508. When each value of the VA-Hash/TTL/ASID-Valid/ASID (S032) matches each value of the VA-Hash/TTL/ASID-Valid/ASID in the buffer 2031, the comparison result is logic "1". When each value of the VA-Hash/TTL/ASID-Valid/ASID (S032) does not match each value of the VA-Hash/TTL/ASID-Valid/ASID in the buffer 2031, the comparison result is logic "0".

Figure 11:
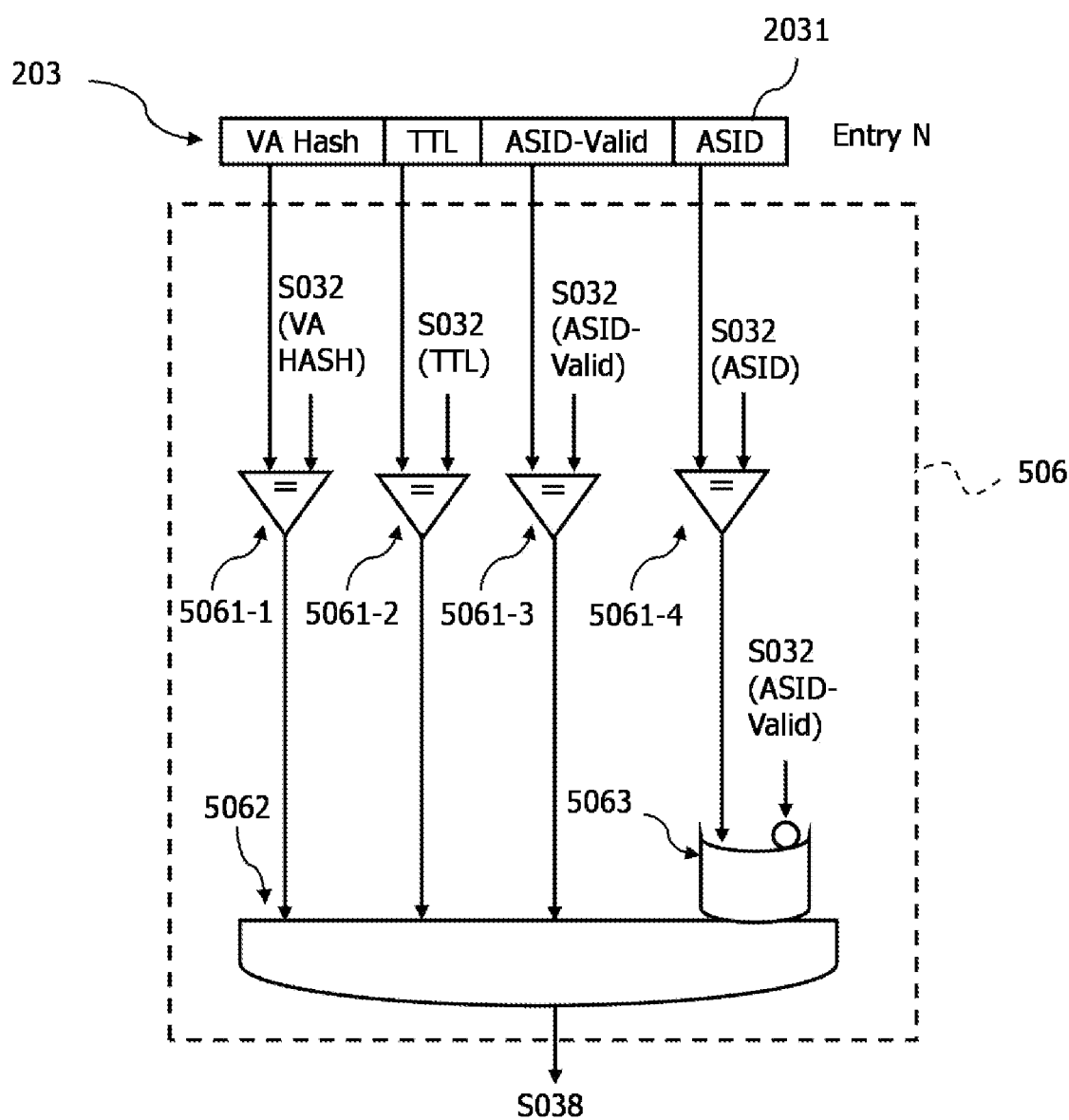
FIG. 11 is a diagram exemplifying the configuration of a comparison circuit in the information processing apparatus as an example of the embodiment.

FIG. 11 is a diagram exemplifying the configuration of the comparison circuit 506 in the information processing apparatus 1 as an example of the embodiment. The comparison circuit 506 includes an AND circuit 5062, an OR circuit 5063, and a plurality of comparison circuits 5061-1 to 5061-4. Hereinafter, when the comparison circuits 5061-1 to 5061-4 are not particularly distinguished from each other, the comparison circuits are referred to as a comparison circuit 5061.

As many comparison circuits 5061 as the number of comparison target elements in the TAG portion are provided. In the example illustrated in FIG. 11, four comparison circuits 5061-1 to 5061-4 respectively corresponding to VA-Hash, TTL, ASID-Valid, and ASID are provided.

In the comparison circuit 5061-1, the VA-Hash of an entry of the page table cache 203 and the VA-Hash of a page table address transmitted from the table walk circuit 202 are input, and a comparison result thereof is input to the AND circuit 5062.

In the comparison circuit 5061-2, the TTL of an entry in the page table cache 203 and the TTL of a page table address transmitted from the table walk circuit 202 are input, and a comparison result thereof is input to the AND circuit 5062.

In the comparison circuit 5061-3, the ASID-valid of an entry in the page table cache 203 and the ASID-valid of a page table address transmitted from the table walk circuit 202 are input, and a comparison result thereof is input to the AND circuit 5062.

In the comparison circuit 5061-4, the ASID of an entry of the page table cache 203 and the ASID of a page table address transmitted from the table walk circuit 202 are input, and a comparison result thereof is input to the OR circuit 5063.

The comparison result of the comparison circuit 5061-4 and a value obtained by inverting the ASID-Valid of a page table address transmitted from the table walk circuit 202 are input to the OR circuit 5063, and a logical sum thereof is output to the AND circuit 5062. A logical product by the AND circuit 5062 (match signal S038) is output to the AND circuit 508.

The AND circuit 508 outputs, as an Entry N hit signal (S028), a logical product of a comparison result output by the comparison circuit 507, a comparison result output by the comparison circuit 506, and the valid bit V stored in the buffer 503, and the buffer 2031 outputs the data signal (S030) indicating page table data. Accordingly, when an entry is valid, the PA indicated by the address signal (S019) matches the PA in the buffer 2031, and the VA-Hash/TTL/ASID-Valid/ASID (S032) of a page table address transmitted from the table walk circuit 202 matches the VA-Hash/TTL/ASID-Valid/ASID stored in the buffer 2031, the Entry N hit signal (S028) is logic "1". For example, the Entry N hit signal (S028) is input to the selector 402 (see FIG. 9). The target of comparison in the comparison circuit 506 is determined according to the type of TLBI (see FIG. 5).

The signal (S029) of the oldest entry of LRU and the page table cache registration signal (S011) are input to the AND circuit 502.

At the time of the operation of entry registration in the page table cache 203, the page table cache registration signal (S011) is 1, and the write signal of an entry is 1 by logical product output of the AND circuit 502 to which the same entry as the oldest entry of LRU and the page table cache registration signal (S011) are inputted.

At this time, the page table address PA (S019), VA-Hash/TTL/ASID-Valid/ASID (S032), and page table data (S024) transmitted from the table walk circuit 202 are written to an entry. At this time, valid bit V is set in the buffer 503.

The page table cache 203 receives the VA-Hash/TTL/ASID-Valid/ASID/PA (S019/S032) of a table address. Each entry N compares each value of VA-Hash/TTL/ASID-Valid/ASID stored in the entry N with each input value of the VA-Hash/TTL/ASID-Valid/ASID/PA (S019/S032), and determines whether the values match each other. A comparison result (match/mismatch) of ASID may be expressed as ASID-match.

The delete signal (Entry N Delete signal) generation circuit 505 generates a delete signal (Entry N Delete signal) for controlling deletion of a specific entry in the page table cache 203. The delete signal generation circuit 505 generates a delete signal in accordance with an instruction from the TLBI control circuit 801 (see FIG. 4).

The delete signal generation circuit 505 selects a VA hash corresponding to TTL from among the three kinds of VA hashes (S031) transmitted from the TLB 204, and sets VA-hash-match.

FIG. 12 is a diagram for describing a method of setting VA-hash-match by the delete signal generation circuit 505 in the information processing apparatus 1 as an example of the embodiment.

In FIG. 12, TTL is TTL held in the buffer 2031 (Entry-N) of the page table cache 203 exemplified in FIG. 10. VA-hash-match (before selection) is a VA hash output from the hashing circuit 803 illustrated in FIG. 4. The delete signal generation circuit 505 sets VA-hash-match based on the combination of VA hashes.

FIG. 13 is a diagram for describing processing of the delete signal generation circuit 505 in the information processing apparatus 1 as an example of the embodiment, and illustrates a rule for generating a delete signal (Entry N Delete signal) by the delete signal generation circuit 505. TLBI-opcode, ASID-Valid, VA-hash-match, and ASID-match are input to the delete signal generation circuit 505.

As illustrated in FIG. 13, the delete signal generation circuit 505 generates and outputs a delete signal (Entry N Delete signal) corresponding to a combination of the input TLBI-opcode, ASID-Valid, VA-hash-match, and ASID-match.

In FIG. 13, "0", "1", and "*" of VA-hash-match and ASID-match indicate output signals of a match circuit (not illustrated) for VA hash and ASID. "0" indicates no matching, and "1" indicates matching. "*" indicates validity regardless of matching or no matching. Regarding delete signal (Entry N Delete signal), "1" indicates deletion, and "0" indicates no deletion.

A delete signal (Entry N Delete signal) output from the delete signal generation circuit 505 is inverted and input to each of the AND circuits 5042 and 5043. The AND circuit 5042 outputs, to the OR circuit 5041, a logical product of the negation of the delete signal and the valid bit V stored in the buffer 503.

The AND circuit 5043 outputs, to the OR circuit 5041, a logical product of the negation of the delete signal and the output of the AND circuit 502. The OR circuit 5041 outputs, to the buffer 503, a logical sum of the output of the AND circuit 5042 and the output of the AND circuit 5043, and the buffer 503 holds the output of the OR circuit 5041 as valid bit V.

Accordingly, when "1" is output as a delete signal (Entry N Delete signal) from the delete signal generation circuit 505, the OR circuit 5041 outputs "0", and "0" is set for valid bit V of the buffer 503.

By setting "0" for valid bit V of the buffer 503 in this manner, the entry of the buffer 2031 corresponding to the buffer 503 in the page table cache 203 is invalidated. Accordingly, the use of data in an old page table that does not match the rewritten page table is prohibited.

For example, in the page table cache 203, only an entry (buffer 2031) specified by VA or ASID included in the accompanying information (S033) of the TLB maintenance instruction (S014/S033) is deleted.

In a case where an instruction of VA, an instruction of ASID, or an instruction of both VA and ASID is given at the time of deleting the cache of a page table by a TLB maintenance instruction, the page table cache 203 deletes only an entry in which there is a matching value for VA hash, ASID, or both of VA hash and ASID. For example, in TLB maintenance, the page table cache 203 determines the target of matching determination according to the type of TLBI.

For example, in the VA instruction type, in TLB maintenance, the page table cache 203 deletes the target entry (buffer 2031) when there is a matching value for VA (VA hash) in the page table cache 203. In the VA instruction type, VA hash corresponds to a match determination target.

In the ASID instruction type, the page table cache 203 deletes the target entry (buffer 2031) when there is a matching value for ASID in the page table cache 203. In the ASID instruction type, ASID corresponds to a match determination target.

In the VA and ASID instruction type, the page table cache 203 deletes the target entry (buffer 2031) when there is a matching value for both of VA (VA hash) and ASID in the page table cache 203. In the VA and ASID instruction type, both of VA hash and ASID correspond to match determination targets.

For example, when a TLB maintenance instruction is executed, the page table cache 203 deletes only an entry in which there is a matching value for at least one of VA hash and ASID (process management information).

The page table cache 203 specifies a match determination target (VA hash, ASID) among VA hash and ASID (process management information) based on the instruction type related to a maintenance instruction, for example, the type of TLBI.

The delete signal generation circuit 505 generates a delete signal (control signal) for setting a bit indicating invalidity for an entry in which there is a matching value for the specified match determination target. The generated delete signal is set as valid bit V set in the buffer 503.

Since the value of valid bit V set in the buffer 503 is input to the AND circuit 508, when "0" is set for valid bit V of the buffer 503, the AND circuit 508 outputs "0" as the Entry N hit signal (S028). Accordingly, a hit does not occur in an entry of the buffer 503 in which "0" is set for valid bit V in the page table cache 203, and the entry is substantially deleted.

(B) Operation

Figure 14:
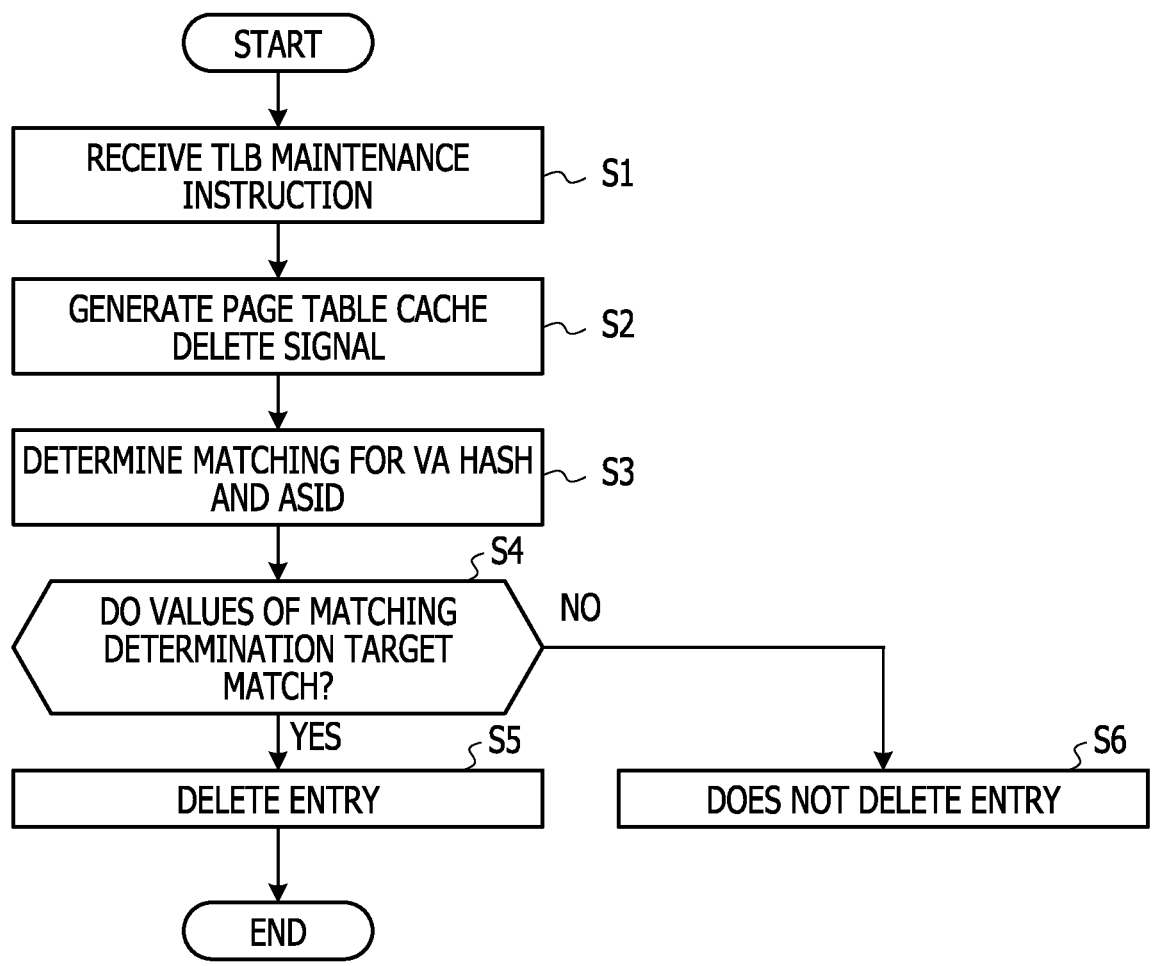
FIG. 14 is a flowchart for describing a method of maintenance of the page table cache in the information processing apparatus as an example of the embodiment.

A method of maintenance of the page table cache 203 in the information processing apparatus 1 as an example of the embodiment configured as described above will be described with reference to a flowchart illustrated in FIG. 14 (operation S1 to operation S6).

In a case where software (OS) rewrites a page table, a TLB maintenance request is issued by the software (OS) in order to resolve a mismatch between an address conversion pair (a combination of a conversion source VA and a conversion destination PA) in the TLB 204 and the page table in the main storage device 105.

When the TLB maintenance request (S001) with accompanying information is issued from the instruction control unit 101 to the L1 data cache 201, the TLB maintenance request is temporarily held in the L1 data cache 201.

After that, the TLB maintenance instruction (S014/S033) is transmitted from the L1 data cache 201 to the TLB 204, and the TLB 204 receives the TLB maintenance instruction (S014/S033) (operation S1).

The control signal (S014) and the accompanying information (S033) are included in the TLB maintenance instruction (S014/S033). The accompanying information (S033) is set according to the type of TLB maintenance instruction, and may include the instruction type of TLB maintenance instruction, an ASID, and a VA.

When the TLB maintenance instruction (S014/S033) is input, the TLB 204 notifies the page table cache 203 of a page table cache delete signal (S015/S031) (operation S2).

The comparison circuit 507 compares the PA indicated by the address signal (S019) with the PA stored in the buffer 2031, and outputs the comparison result to the AND circuit 508. The comparison circuit 506 compares the VA-Hash/TTL/ASID-Valid/ASID (S032) of a page table address transmitted from the table walk circuit 202 with VA-Hash/TTL/ASID-Valid/ASID of the TAG portion stored in the buffer 2031, and the comparison result is output to the AND circuit 508.

The comparison circuit 506 compares each value of the VA-Hash/TTL/ASID-Valid/ASID (S032) of a page table address transmitted from the table walk circuit 202 with each value of VA-Hash/TTL/ASID-Valid/ASID of the TAG portion stored in the buffer 2031 (operation S3). The comparison circuit 506 determines whether matching occurs for the target of matching determination (VA hash, ASID, or the like) determined according to the instruction type specified by the type of TLBI among VA-Hash/TTL/ASID-Valid/ASID (operation S4).

When the values of the matching determination target match each other for each value of the VA-Hash/TTL/ASID-Valid/ASID (S032) of a page table address and each value of VA-Hash/TTL/ASID-Valid/ASID of the buffer 2031 (see YES route in operation S4), the processing proceeds to operation S5.

In operation S5, the target entry (buffer 2031) in the page table cache 203 is deleted, and the maintenance processing of the page table cache 203 ends.

On the other hand, when the values of the matching determination target does not match each other for each value of the VA-Hash/TTL/ASID-Valid/ASID (S032) of a page table address and each value of VA-Hash/TTL/ASID-Valid/ASID of the buffer 2031 (see NO route in operation S4), the processing proceeds to operation S6.

In operation S6, deletion of the target entry (buffer 2031) in the page table cache 203 is suppressed, and the maintenance processing of the page table cache 203 ends.

(C) Effects

As described above, according to the information processing apparatus 1 as an example of the embodiment, in the page table cache 203, a hash of a VA of the conversion source and an ASID are stored in each entry that manages data of a page table. When a TLB maintenance instruction (instruction to delete a TLB) specifying VA, ASID, or both of VA and ASID is executed, only an entry in which there is a matching value for VA hash, ASID, or both of VA and ASID is deleted.

For example, in a case where a TLB maintenance request is issued, in the page table cache 203, the comparison circuit 506 determines whether matching occurs for the target of matching determination (VA hash, ASID, or the like) determined according to the instruction type specified by the type of TLBI among VA-Hash/TTL/ASID-Valid/ASID stored in an entry of the page table cache 203.

When the values of the matching determination target match each other for each value of the VA-Hash/TTL/ASID-Valid/ASID (S032) of a page table address and each value of VA-Hash/TTL/ASID-Valid/ASID of the buffer 2031, an entry of the maintenance target is deleted.

For example, when the type of TLBI is the VA instruction type, the page table of an entry in which there is a matching value for VA (VA hash) is deleted in the page table cache 203. In the ASID instruction type, the page table of an entry in which there is a matching value for ASID is deleted in the page table cache 203. In the VA and ASID instruction type, the page table of an entry in which there is a matching value for both of VA (VA hash) and ASID is deleted in the page table cache 203.

Accordingly, when a TLB maintenance instruction specifying VA, ASID, or both of VA and ASID is executed, only an entry in which there is a matching value for VA, ASID, or both of VA and ASID is deleted according to the type of TLBI, without deleting the entire page table cache 203. Accordingly, since an entry with a different value of VA is not deleted by a TLB maintenance instruction of the VA instruction type, an improvement in the hit rate of the page table cache 203 may be expected. Similarly for a TLB maintenance instruction of the ASID instruction type and a TLB maintenance instruction of the VA and ASID instruction type, there is an effect of hit rate improvement. Accordingly, it is possible to suppress a decrease in the hit rate by a TLB maintenance instruction in the page table cache 203.

(D) Others

The configuration and processing of the present embodiment may be selectively employed or omitted as desired, or may be combined as appropriate. The disclosed technique is not limited to the above-described embodiment. The present embodiment may be carried out while being modified in various ways without departing from the gist of the present embodiment.

For example, although VA-Hash/TTL/ASID-Valid/ASID are managed in each entry of the page table cache 203 in the above-described embodiment, this is not the only case. For example, other information such as regime or virtual machine identifier (VMID) may be managed. The present embodiment may be carried out by being changed as appropriate.

Although an example in which ASID is used as process management information is described in the above-described embodiment, this is not the only case. Information other than ASID may be used as information with which an OS manages a process. The present embodiment may be carried out by being changed as appropriate. The above-described disclosure enables a person skilled in the art to carry out and manufacture the present embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:
1. An information processing apparatus comprising:
a conversion buffer configured to store a conversion pair of a virtual address of a page and a physical address;
a page table cache configured to store data in a page table at a level other than a last level among page tables at a plurality of levels included in a multistage page table and a physical address of the data in association with each other;

a memory; and a processor coupled to the memory, and configured to:

store a hash of the virtual address and process management information of a conversion source in each entry of the page table cache, specify at least one of the hash of the virtual address or the process management information based on a maintenance instruction of deleting the conversion pair in the conversion buffer, determine a match of an entry of at least one of the hash of the virtual address and the process management information, and delete the determined match in the page table cache based on the maintenance instruction.

2. The information processing apparatus according to claim 1, wherein the processor is configured to specify a determination target of the matching between the hash of the virtual address and the process management information, based on an instruction type related to the maintenance instruction.

3. The information processing apparatus according to claim 2, wherein the processor is configured to generate a control signal for setting a bit that indicates validity or invalidity for an entry of matching for the specified match determination target.

4. A control method of an information processing apparatus that includes a conversion buffer configured to store a conversion pair of a virtual address of a page and a physical address, a page table cache configured to store data in a page table at a level other than a last level among page tables at a plurality of levels included in a multistage page table and a physical address of the data in association with each other, the control method comprising:

storing a hash of the virtual address and process management information of a conversion source in each entry of the page table cache; and specify at least one of the hash of the virtual address or the process management information based on a maintenance instruction of deleting the conversion pair in the conversion buffer, determining a match of an entry of at least one of the hash of the virtual address and the process management information, and deleting the determined match in the page table cache based on the maintenance instruction, by a processor.

5. The control method according to claim 4, wherein the processor specifies a determination target of the matching between the hash of the virtual address and the process management information, based on an instruction type related to the maintenance instruction.

6. The control method according to claim 5, wherein the processor generates a control signal for setting a bit that indicates validity or invalidity for an entry of matching for the specified match determination target.

* * * * *